July 27, 1965 S. C. W. WILKINSON 3,196,737
GLAND PACKING MATERIAL
Filed Dec. 10, 1962

United States Patent Office 3,196,737
Patented July 27, 1965

3,196,737
GLAND PACKING MATERIAL
Samuel Clifford Walter Wilkinson, Cookham, England, assignor to Crane Packing Limited, Slough, England, a British company
Filed Dec. 10, 1962, Ser. No. 243,278
Claims priority, application Great Britain, Dec. 9, 1961, 44,148/61
16 Claims. (Cl. 87—6)

This invention relates to a packing material for glands. In the past packing material for glands, stuffing boxes and seals has taken the form of a fibrous material such as asbestos or hemp or cotton rope impregnated with tallow or grease, and it is known for a packing ring of asbestos fibers to be enclosed in a toroidally wound casing of copper tape. More recently, proposals have been made for using polytetrafluoroethylene (PTFE) as a packing material. The chief properties of this material are its chemical inertness and its low coefficient of friction in relation to a wide range of engineering materials and its usefulness as a packing material will therefore be readily understood. Packing rings have therefore been made by moulding PTFE in dies. However, the moulding process causes the rings to be sintered, so they are relatively hard and unyielding, and whilst satisfactory on shafts that run true and with accurately machined stuffing boxes, they are less effective where any degree of inaccuracy or misalignment is present.

It has also been proposed to use PTFE in the form of a tape as a toroidal wrapping or jacket on a core of asbestos fibres and other materials in place of the casing of copper tape mentioned earlier. However, this PTFE in the form of a sintered tape is relatively hard and non-yielding and a gasket formed in this way cannot easily accommodate itself to undulations or errors in alignment of the relatively moving parts.

PTFE in an unsintered form has also been proposed for gaskets. It has been moulded into rings from a pulpy mass or slurry formed by a mixture of oriented shreds or flakes of PTFE mixed with a lubricant. The unsintered PTFE is more pliable than the rigid sintered form and is therefore an improvement over it in suitable conditions. It has been proposed to form such shredded or flaked unsintered PTFE into a string which is braided to form a packing material.

Other packing materials have also been used in braided form, with or without a central core.

Unsintered PTFE alone, however, is unsuitable for forming a seal between members having a high speed or relative movement because the PTFE, as well as being pliable, is mechanically weak and can disintegrate through flaking of its surface. Furthermore it is a poor conductor of heat and cannot easily get rid of the heat generated at its rubbing surface, so that the seal may become overheated and damaged.

It is an aim of the invention to provide a new form of seal that is based on PTFE in unsintered form and overcomes these drawbacks.

According to the invention we now propose a gland packing or sealing material comprising a strip or ring of composite structure comprising strands or cords of unsintered PTFE braided together with strands or cords of another material, not a synthetic resin, such as asbestos string or metallic wire. For example the strip may be braided from alternate cords of PTFE and asbestos string. The PTFE provides the pliability and ability, to conform to the shape of the space available, while the asbestos fibres protect the adjacent cords of PTFE and help to resist the tendency of the PTFE to flake off. Where there is a possibility of substantial heat being developed the cords braided with the PTFE cords could be strands of copper wire, forming a heat-conducting path of low thermal resistance.

The cords of PTFE and the cords of asbestos, copper or other material could be arranged alternately in the braiding. The resulting braided strip could be hollow or it could be formed around a core of unwoven asbestos or other fibres.

The invention will now be described by way of example with reference to the accompanying drawings, in which.

Figure 1:
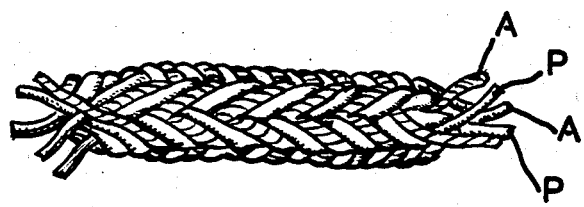
FIGURE 1 is an external view of a length of strip according to the invention.

Referring first to FIGURE 1, the simplest form of strip according to the invention is prepared by mounting on alternate spindles of a conventional braiding machine reels of asbestos fibre string and reels of unsintered PTFE cord. The PTFE cord can be produced by extruding unsintered PTFE powder in the form of a coagulated dispersion through a die under pressure, the powder having a suitable lubricant such as toluene or white oil-incorporated in it before extrusion. The strip shown in FIGURE 1 is simply a hollow tube of braised alternate cords P of PTFE and cords A of asbestos string, with no core. It may be used as a packing or gland material in a wide variety of applications, both with reciprocating and rotating members. The PTFE gives pliability, low friction, and the ability to conform to varying shapes, while the asbestos reinforces and supports the PTFE which alone is relatively weak. The presence of the asbestos alongside the PTFE and in close proximity to it reduces or eliminates any tendency of the PTFE to flake away.

One of the problems associated with braiding of normal materials is the tendency to unravel at the ends when a length of strip is cut but with the mixture of the PTFE cords with the other cords this is reduced by the "dead" characteristics of PTFE, which shows no tendency to unravel in these circumstances.

It will be understood that although it is preferred to use equal numbers of cords of PTFE and of the other material, the ratio could be varied as desired. For example, if the flaking tendency were expected to be only slight there could be twice as many cords of PTFE as other cords in the braiding.

The strip shown in FIGURE 1 can be produced in indefinite lengths and then cut to length as required for particular applications. Instead of the cords P being of pure asbestos string they could be of metal-wire-reinforced asbestos, or they could be strands of wire, such as copper wire. The high thermal conductivity of copper makes it suitable for use where the packing is expected to generate appreciable amounts of heat, as the copper readily conducts away the heat into the interior of the packing and into the surrounding stuffing box.

Other possible materials for the cords mixed with the PTFE cords in the braiding are hemp and cotton. In fact any fibrous material or metal may be used, or another material capable of being formed into strands or cords that will reinforce or protect the cords of PTFE. The applicants have found that after extensive trails unexpectedly, only braiding together mixed strands of PTFE cord and of the other material achieves a satisfactory result, and the desired results cannot be obtained effectively by simply twisting them together or by incorporating reinforcement within an outer casing of PTFE.

Figure 2:
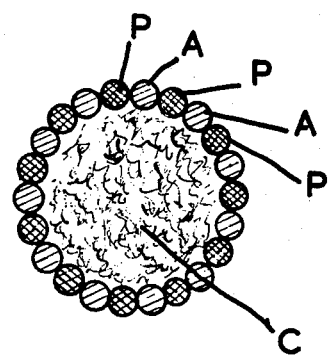
FIGURE 2 is a cross section showing another form of the strip, that includes a core.

FIGURE 2 shows a section through a strip similar to that of FIGURE 1 but whereas that of FIGURE 1 is a hollow tube, that of FIGURE 2 is braided onto a core C of asbestos or other fibres. The inclusion of the asbestos core accommodates big thermal fluctuations in that, at high temperatures, the PTFE tends to expand while the asbestos tends to dry out and shrink, and at low temperatures the reverse effect occurs, thus eliminating the need for constant readjustment of the gland. The core could be of any of the other fibres known and used in the cores of known gland packings.

Figure 3:
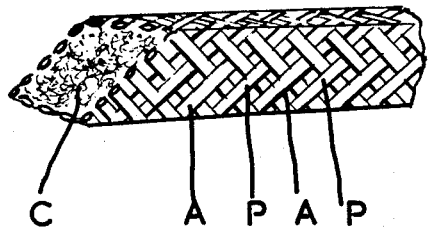
FIGURE 3 shows a strip shaped for use as a packing.

The strip may be used in its condition as formed, i.e. with a round cross-section, and the act of tightening the gland deforms it to the required shape, but if desired the packing may already be shaped to the required cross-section by squeezing it in a die after formation. FIGURE 3 shows a packing like that of FIGURE 2 after squeezing in a die to a rectangular cross-section.

The size of the PTFE cord used will depend on the size of packing required. In a typical case the PTFE is extruded into a cord of one sixteenth of an inch in diameter. The cord, string or wire of the other material used is preferably of the same diameter as the PTFE.

I claim:

1. A gland packing material in the form of a strip of composite structure comprising strands of unsintered PTFE and strands of a non-synthetic resin material of greater strength than PTFE, said strands being braided together.

2. A gland packing material as set forth in claim 1 wherein said strands of PTFE and said strands of other material are arranged alternately in the braid.

3. A gland packing material as set forth in claim 1 including a central core of fibrous material, said braided strands enclosing said core.

4. A gland packing material in the form of a ring of composite structure comprising strands of unsintered PTFE and strands of a non-synthetic resin material of greater strength than PTFE, said strands being braided together.

5. A gland packing material as set forth in claim 4, including a central core of fibrous material, said braided strands enclosing said core.

6. A gland packing material as set forth in claim 4 wherein said strands of PTFE and said strands of other material are arranged alternately in the braid.

7. A gland packing material in the form of a strip of composite structure comprising strands of unsintered PTFE and strands of asbestos fibre, said strands being braided together.

8. A gland packing material as set forth in claim 7 wherein said strands of PTFE and said strands of asbestos fibre are arranged alternately in the braid.

9. A gland packing material as set forth in claim 7, wherein said strip is curved around and thereby forms a ring.

10. A gland packing material as set forth in claim 7 wherein said strands of asbestos incorporate metal wire reinforcement.

11. A gland packing material as set forth in claim 7 including a central core of fibrous material, said braided strands enclosing said core.

12. A gland packing material in the form of a strip of composite structure comprising strands of unsintered PTFE and strands of metal wire, said strands being braided together.

13. A gland packing material as set forth in claim 12 wherein said strands of PTFE and said strands of metal wire are disposed alternately in the braid.

14. A gland packing material as set forth in claim 12 wherein said strip is curved around and thereby forms a ring.

15. A gland packing material as set forth in claim 12 wherein said metal wire is copper.

16. A gland packing material as set forth in claim 12 including a central core of fibrous material, said braided strands enclosing said core.

References Cited by the Examiner

UNITED STATES PATENTS

| | | | |
|---|---|---|---|
| 1,927,477 | 9/33 | Walton | 87—8 X |
| 1,930,766 | 10/33 | Moore | 87—6 |
| 2,107,467 | 2/38 | Buhler | 87—6 |
| 2,840,881 | 7/58 | Bateman. | |
| 2,930,106 | 3/60 | Wrotnowski | 28—1 |

FOREIGN PATENTS

| | | |
|---|---|---|
| 467,023 | 8/50 | Canada. |
| 861,506 | 2/61 | Great Britain. |

OTHER REFERENCES

Publication by Du Pont Teflon, Received in U.S. Patent Office, Group 440 on May 25, 1954; article entitled "Packings: Design Consideration," page 9 relied upon.

Publication by Du Pont "The Journal of Teflon," June 1961, pages 1, 4 and 5; article entitled "Packings of 'Teflon' Put A Wedge In the Profits Squeeze."

Publication by Du Pont, "The Journal of Teflon," September 1961, pages 1, 4 and 5; article entitled "The Role of 'Teflon' Resins In Modern Gasket Design."

MERVIN STEIN, *Primary Examiner.*